United States Patent [19]

Gievers

[11] 3,773,421
[45] Nov. 20, 1973

[54] MONITORING RELATIVE DISPLACEMENT

[75] Inventor: John George Gievers, Rochester, Mich.

[73] Assignee: Chrysler Corporation, Highland Park, Mich.

[22] Filed: Sept. 30, 1964

[21] Appl. No.: 400,596

[52] U.S. Cl................. 356/152, 356/172, 250/225
[51] Int. Cl. ............................................ G01b 11/26
[58] Field of Search................ 88/14, 14 A, 14 PL; 250/225; 350/157, 148; 356/152, 172

[56] References Cited
UNITED STATES PATENTS

| | | | |
|---|---|---|---|
| 2,998,746 | 9/1961 | Gievers | 350/157 UX |
| 3,117,176 | 1/1964 | Marks et al. | 350/148 X |
| 3,183,763 | 5/1965 | Koester | 350/157 X |
| 3,087,377 | 4/1963 | Daley | 250/225 X |
| 3,218,913 | 11/1965 | Kaestner | 88/14 A |

Primary Examiner—Benjamin A. Borchelt
Assistant Examiner—S. C. Buczinski
Attorney—Harness and Harris

[57] ABSTRACT

The monitoring system disclosed herein comprises apparatus for transmitting a polarized and modulated light beam from a source at the one monitoring point and splitting the light beam into a plurality of beam portions having different spectral ranges or colors. Each color is directed through one or more transducers, positioned at the other monitoring point, which modify the polarization of the light beam portion. Each transducer is of a type such that the amount of birefringence depends upon the angle which the transducer is rotated about its sensitive axis from an initial position, and the transducer is substantially insensitive to rotations about any other coplanar axis. The beam portions of different colors are combined in a beam and reflected to analyzers adjacent the light source where they are again separated into colors and analyzed separately to determine the change in polarity due to birefringent action. A signal is produced which is a measure of the degree of angular displacement. This signal can be utilized to control servo motors for restoring the two monitoring points to their original relative positions. The analyzing of the portions of light beam is preferably accomplished at the first monitoring point where the beam source is positioned.

5 Claims, 4 Drawing Figures

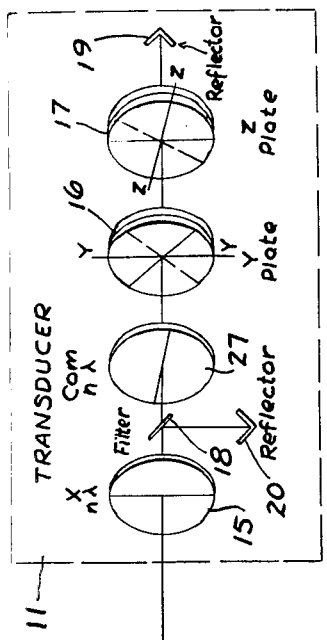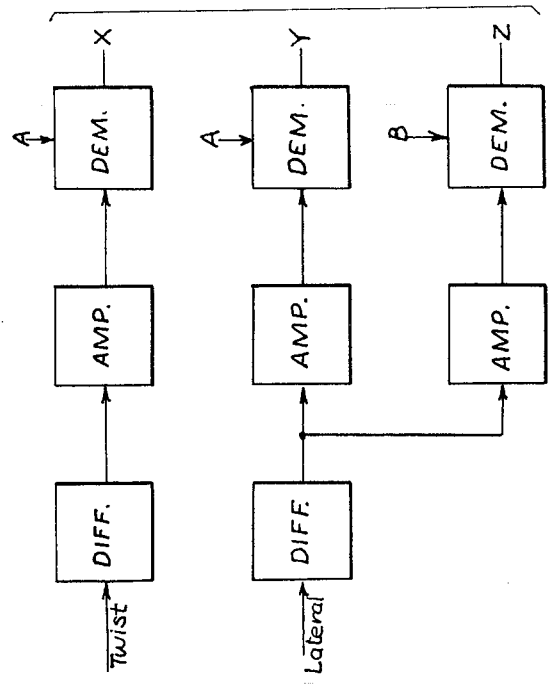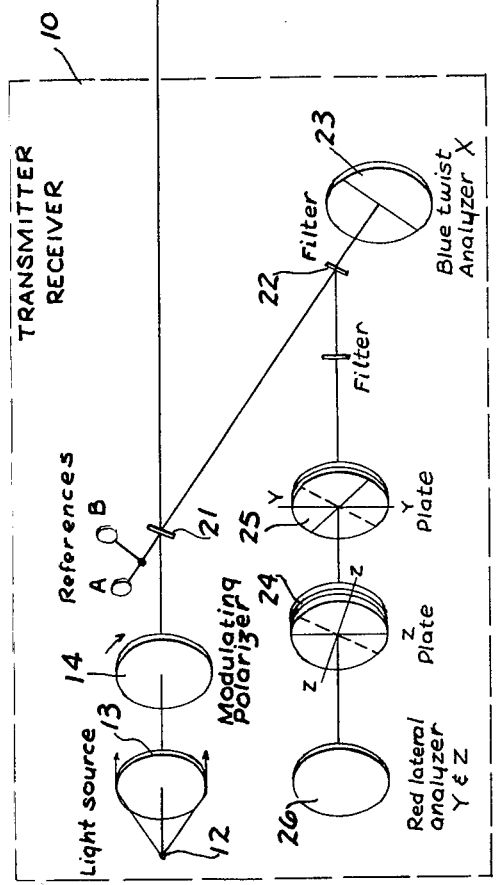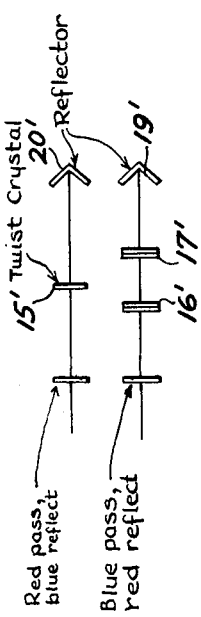

MONITORING RELATIVE DISPLACEMENT

This invention relates to monitoring the relative displacement between two devices about a plurality of axes.

The problem of monitoring accurately is of importance in numerous applications, such as determining the relative displacement of a stabilized platform relative to a reference platform and determining the angle that a star makes with a reference point.

It is an object of this invention to provide an electro-optical method and apparatus for monitoring the relative position and displacement of one device with respect to another reference device.

It is a further object of the invention to provide such a method and apparatus for monitoring the relative displacement about a plurality of axes.

It is a further object of the invention to provide a method and apparatus utilizing light wherein the analyzers are positioned remotely from the transducers.

It is a further object of the invention to provide a method and apparatus which is accurate, reliable and produces a minimum of alignment and cross coupling problems.

Basically, the invention comprises transmitting a polarized and modulated light beam from a source at the one monitoring point and splitting the light beam into a plurality of beam portions having different spectral ranges of colors. Each color is directed through one or more transducers, positioned at the other monitoring point, which modify the polarization of the light beam portion. Each transducer is of a type such that the amount of birefringence depends upon the angle which the transducer is rotated about its sensitive axis from an initial position, and the transducer is substantially insensitive to rotations about any other coplanar axis. The beam portions of different colors are combined in a beam and reflected to analyzers adjacent the light source where they are again separated into colors and analyzed separately to determine the change in polarity due to birefringement action. A signal is produced which is a measure of the degree of angular displacement. This signal can be utilized to control servo motors for restoring the two monitoring points to their original relative positions. The analyzing of the portions of light beam is preferably accomplished at the first monitoring point where the beam source is positioned.

In the drawings:

FIG. 1 is a diagrammatic perspective view of a monitoring system embodying the invention.

FIG. 2 is a block diagram of the electronic system utilized in the invention.

FIG. 4 is a diagrammatic view of a modified portion of the monitoring system.

Figure 3:
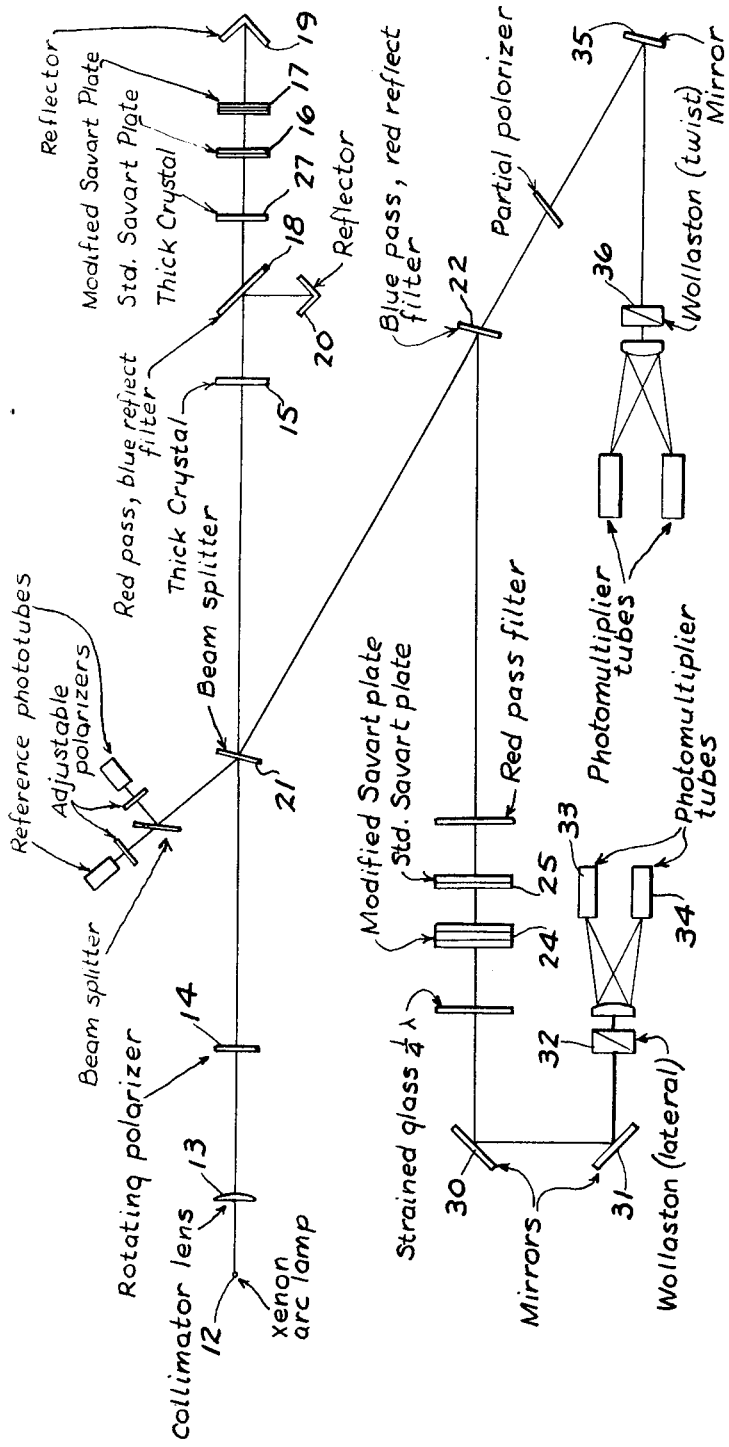
FIG. 3 is a more detailed diagrammatic view of the system shown in FIG. 1.

Referring to FIG. 1, the monitoring system includes a transmitter-receiver 10 which is adapted to be rigidly fixed to one device at one monitoring point and a transducer 11 which is adapted to be rigidly fixed to another device at another monitoring point, the relative displacement between the two devices being monitored by the system.

As shown in FIG. 1, the transmitter-receiver 10 includes a light source 12, such as a Xenon arc, which directs a white beam of light to a collimating lens 13. The collimated beam passes through a rotating polarizer 14, which causes a rotating plane of polarization, and is directed out of the transmitter-receiver 10 to the transducer 11.

The term "transducer" as used herein is intended to mean a device which modifies the light depending on the orientation of the device with respect to the path of the light beam. Alternatively, the term "light modifier" is also used in the specification and claims.

The transducer 11 includes a plurality of transducer elements or plates, each of which has a sensitivity about an axis which is being monitored, that is, about a twist axis, and about two lateral axes. The twist transducer element comprises a multiple wave plate which has a principal axis and rotates the plane of polarization in proportion to any rotation of the plate relative to the principal axis. The multiple wave plate has an effect similar to a half wave plate which rotates the plane of polarization. For example, in the case being described, the plate 15 is positioned in the path of the light beam and rotates the plane of polarization for the mean effective color of blue. The plate 15 is so arranged that its axis is oriented 45 degrees with respect to the principal axis of the analyzer 23. When so positioned, the plate 15 has no effect on the output. If the plate 15 is rotated about the axis of the light beam because of a twist or rotation of the piston that is being monitored, then the plane of polarization of the light beam will be rotated or modified. This modification in the light beam can be analyzed, as presently described, to produce a signal.

In order to analyze the relative displacement about lateral axes, the transducer 11 also includes lateral transducer plates 16, 17 which are sensitive to rotations of the transducer 11 about lateral axes, designated Y—Y and Z—Z. However, prior to passage of the light beam through the plates 16, 17, the light beam is directed through a dichroic filter 18 that splits the light beam into two spectral ranges of colors. One color passes through the filter 18 and another color is reflected by the filter 18. For example, the filter 18 may comprise a red pass-blue reflect dichroic filter such as manufactured and sold by Libby-Owen-Ford Glass Company of Toledo, Ohio under designation LOF 90–500.

Each of the transducer plates 16, 17 is of a type such that it is sensitive to rotation about one axis and relatively insensitive to rotation about other axes. A suitable lateral axis transducer is that which is known as a Savart plate described in ANN. DER PHYSIK 49(1840), page 292. Such a device comprises a combination of birefringence crystals so arranged that the amount of birefringence it exhibits depends upon the angle through which the transducer has been rotated around a particular axis perpendicular to the direction of propagation of the incident light. As long as the base of the transducer is perpendicular to the incident light beam, the transducer will exhibit no birefringence and the incident light will pass through unchanged. However, as the transducer support and with it the transducer plate 16 or 17 is rotated about a sensitive axis of one of the lateral transducer plates 16, 17, that transducer plate exhibits increasing birefringence. The chief effect of the birefringence will be to change the circularly polarized incident light into elliptically polarized light. Within the range of movement contemplated by the present system, ellipticity will increase with increasing angle and the major axes of the ellipses formed will be either vertical or horizontal, depending upon the direction of rotation.

Savart plates 17 and 24 are preferably modified by inclusion of a half wave plate for the particular color involved. This permits the sensitive axis of the Savart plate 16 to be at 90° relative to the sensitive axis of the Savart plate 17 so that lateral deviations at 90° to one another can be detected.

After passing through the transducer plates 16, 17, the one color of the light beam, such as the red, is reflected by a red reflect-blue pass reflector 19 back through the transducer plates 16, 17 and the twist transducer plate 15 to the transmitter receiver 10 where the red component of the light beam is analyzed for changes due to rotation of the transducers 16, 17, as presently described.

The other color, namely the blue, is reflected by a reflector 20 to the filter 18 and by filter 18 back through the twist transducer 15 to the transmitter-receiver 10 where said blue component of the light beam is analyzed for changes in rotation of the plane of polarization due to rotation of the twist transducer 15 about the axis of the light beam, as presently described.

Referring to FIGS. 1 and 3 colors from the transducer 11 are combined and returned to the transmitter-receiver 10 where the colors are separated by a dichroic filter 22 to which the beam is reflected by beam splitter 21. The dichroic filter 22 permits the blue color to pass therethrough and deflects the red color.

The blue color then passes to an analyzer 23 that comprises a plane analyzer which is insensitive to elliptical polarization signals, such as created by the lateral axes transducers 16, 17. The red component of the light passes through compensating lateral axes tranducer plates 24, 25 to an analyzer 26 which is of the elliptical analyzer type that is insensitive to plane polarization signals.

In order to prevent lateral displacement measurements as the transducer is moved laterally across a light field of slightly diverging rays, compensating lateral transducers 24, 25 or Savart plates, identical to transducer plates 16, 17, are required. As a result, lateral displacement of the transducers 11 can occur without causing an erroneous signal.

To eliminate any erroneous signals on the transducer plate 15 because of the thick crystal effect of transducers 16, 17, a compensating multiple wave plate 27 is provided in the path of the red light and between the filter 18 and transducer 16.

The signals produced by the transducers 16, 17 are 90° out of phase with respect to one another and are compared electrically to reference signals. Such reference signals are shown diametrically in FIG. 2 as A' and B' and are achieved by reflecting a portion of the original light beam from the source 12 to receivers A and B (FIG. 1) in the transmitter receiver 10, the reference signals being 90° out of phase relative to one another with respect to time.

Referring to FIG. 3, there is shown a modified transmitter receiver. As shown in FIG. 3, the red color passing through the compensating transducer plates 24, 25 is reflected by mirrors 30, 31 to save space, and then to the analyzer 26 which includes a Wollaston prism 32 and a pair of photocells 33, 34. The Wollaston prism 32 is so oriented that it polarizes the light beam passing therethrough into two beams which are oriented in a vertical and horizontal direction and are polarized in vertical and horizontal planes. The two beams then pass to photocells 33, 34, respectively. The electrical currents created in the photocells 33, 34 can then be compared.

The manner in which the parts are electrically connected is shown in FIG. 2 wherein a differential amplifier is provided in association with the light analyzer and demodulator are provided in association therewith, as presently described.

With the arrangement shown, each transducer 16, 17 when rotated about its sensitive axis will change the plane polarized portions of the circularly polarized light to elliptically polarized light. Since the sensitive axis of the transducers 16, 17 are perpendicular to each other, any rotation of the transducers about their sensitive axes will cause distinct changes in the polarization. This will cause outputs at photocells 33, 34. FIG. 2 is a schematic diagram of the circuit for comparing the outputs of the photocells or photo multiplier tubes with reference signals to produce a net signal indicating the displacement of the monitored position with respect to the source position. When these outputs are differentiated, amplified and compared with reference signals A' B' (FIG. 2) by demodulators, output signals will be produced corresponding to the rotation of the transducers 16, 17 about their respective axes.

Similarly, the blue portion of the light beam passing through filter 22 is reflected by a mirror 35 to a Wollaston prism 36 where its polarity is analyzed and compared with the reference signal A' (FIG. 2) to indicate the degree and direction of rotation of the twist transducer 15.

Each output can be read out to give a direct reading of displacement or fed back to servo motors which can return the receiver to alignment about both lateral axes simultaneously. This will align the planes of the transducer faces perpendicular to the light beam and erase all the output signals.

In the form of the invention shown in FIG. 4, filter 18 is eliminated and portions of the beam from the source are directed respectively and separately through twist transducers 15' and lateral axes transducers 16', 17'. The beams are then reflected back to the transducers by reflectors 20', 19' and combined to the receiver where the beam portions are separated and analyzed as described in connection with FIGS. 1 and 3.

I claim:

1. An apparatus for monitoring the relative displacements between two positions, said apparatus comprising
    a light source at one monitoring position,
    means for polarizing and modulating the light from said light source into a polarized and modulated beam having a rotating plane of polarization,
    a plurality of light modifiers positioned at said other monitoring position,
    each of said light modifiers having a sensitive axis about which it may be rotated to change the birefringent action thereof and being substantially insensitive to rotations about any other coplanar axis,
    each of said light modifiers being positioned so that its sensitive axis is angularly different from the sensitive axis of the other light modifiers,
    means for dividing said beam into portions of different spectral ranges,
    means for directing one spectral range portion through one of said light modifiers, means for directing another spectral range portion through another said light modifier, and means at said first mentioned position for analyzing each of said portions for changes in the form of polarization due to rotation of the light modifiers positioned in the paths thereof.

2. The combination set forth in claim 1 including means at said other monitoring position for reflecting said beam portions back through their respective light modifiers to said first mentioned monitoring position.

3. The combination set forth in claim 1 wherein two of said light modifiers are sensitive to rotations about lateral axes and one of said light modifiers is sensitive to rotations about a twist axis.

4. The combination set forth in claim 1 wherein said means for dividing said beam into portions of different spectral ranges is positioned between two of said light modifiers.

5. The combination set forth in claim 1 wherein said means for dividing said beam into portions of different spectral ranges is positioned in advance of said light modifiers.

* * * * *